United States Patent
Alexander et al.

(10) Patent No.: US 9,838,890 B2
(45) Date of Patent: Dec. 5, 2017

(54) METHOD OF MEASURING INTEGRITY OF WIRELESS SIGNALLING SYSTEMS

(71) Applicant: TEXECOM LIMITED, Lancashire (GB)

(72) Inventors: Peter Alexander, Greater Manchester (GB); Richard Day, Lancashire (GB)

(73) Assignee: TEXECOM LIMITED, Haslingden, Lancashire (GB)

( * ) Notice: Subject to any disclaimer, the term of this patent is extended or adjusted under 35 U.S.C. 154(b) by 38 days.

(21) Appl. No.: 14/409,603

(22) PCT Filed: Jun. 20, 2013

(86) PCT No.: PCT/GB2013/000274
§ 371 (c)(1),
(2) Date: Dec. 19, 2014

(87) PCT Pub. No.: WO2013/190258
PCT Pub. Date: Dec. 27, 2013

(65) Prior Publication Data
US 2015/0195722 A1     Jul. 9, 2015

(30) Foreign Application Priority Data

Jun. 20, 2012 (GB) .................................. 1210920.3

(51) Int. Cl.
*H04B 7/00* (2006.01)
*H04W 24/04* (2009.01)
(Continued)

(52) U.S. Cl.
CPC ......... *H04W 24/04* (2013.01); *H04L 41/0668* (2013.01); *H04L 45/22* (2013.01);
(Continued)

(58) Field of Classification Search
CPC ..... H04W 40/04; H04W 40/12; H04W 40/14; H04W 40/24; H04W 40/28; H04W 40/30
(Continued)

(56) References Cited

U.S. PATENT DOCUMENTS 7,400,583 B2 *   7/2008   Friskney ............. H04L 41/5003
                                                           370/235
7,436,810 B2 *  10/2008   Ma ........................ H04W 40/16
                                                           370/238
(Continued)

FOREIGN PATENT DOCUMENTS

GB        2458540 A       9/2009
GB        2479136 A      10/2011
WO     2007079280 A2      7/2007

OTHER PUBLICATIONS

Srinivas, A. and Modiano,E., "Finding Minimum Energy Disjoint Paths in Wireless Ad-Hoc Networks," Wireless Networks 11, 401-417, 2005, Springer Science + Business Media, Inc.
(Continued)

*Primary Examiner* — Dmitry H Levitan
(74) *Attorney, Agent, or Firm* — Barlow, Josephs & Holmes, Ltd.

(57) ABSTRACT

A method of measuring system integrity and robustness to link failure for use with a wireless signaling system is described. The measuring system can calculate the number of unique communication routs available for message transfer between an initiating device and a target device wherein unique routes are non-converging and defined by message source and signal strength data derived from a plurality of system devices.

12 Claims, 2 Drawing Sheets

(51) Int. Cl.
    *H04W 40/24* (2009.01)
    *H04L 12/703* (2013.01)
    *H04L 12/24* (2006.01)
    *H04L 12/707* (2013.01)
    *H04W 40/14* (2009.01)
    *H04W 40/20* (2009.01)
    *H04W 40/12* (2009.01)
    *H04L 12/735* (2013.01)
    *H04W 40/08* (2009.01)

(52) U.S. Cl.
    CPC ............. *H04L 45/28* (2013.01); *H04W 40/14* (2013.01); *H04W 40/20* (2013.01); *H04W 40/246* (2013.01); *H04L 45/128* (2013.01); *H04W 40/08* (2013.01); *H04W 40/12* (2013.01); *Y02B 60/50* (2013.01)

(58) Field of Classification Search
    USPC .................................. 370/310, 328, 329, 349
    See application file for complete search history.

(56) References Cited

U.S. PATENT DOCUMENTS

| | | | | |
|---|---|---|---|---|
| 7,590,756 | B2 * | 9/2009 | Chan | H04L 1/08 370/225 |
| 7,751,318 | B2 * | 7/2010 | Venkat | H04L 45/02 370/230 |
| 8,036,224 | B2 * | 10/2011 | Axelsson | H04L 45/00 370/216 |
| 8,578,054 | B2 * | 11/2013 | Thubert | H04L 45/128 370/225 |
| 8,717,869 | B2 * | 5/2014 | Yang | H04L 41/0654 370/216 |
| 9,030,939 | B2 * | 5/2015 | Hui | H04W 40/023 370/241 |
| 9,119,130 | B2 * | 8/2015 | Hui | |
| 2008/0267181 | A1 * | 10/2008 | Monga | H04L 45/00 370/390 |
| 2009/0059814 | A1 * | 3/2009 | Nixon | H04L 41/12 370/254 |
| 2009/0228575 | A1 | 9/2009 | Thubert et al. | |
| 2009/0310544 | A1 | 12/2009 | Jain et al. | |
| 2010/0260070 | A1 * | 10/2010 | Bejerano | H04L 45/125 370/255 |

OTHER PUBLICATIONS

Tang, J. et al., "Node-Disjoint Path Routing in Wireless Networks: Tradeoff between Path Lifetime and Total Energy", 2004 IEEE International Conference on Communications; ICC 2004; Jun. 20-24, 2004, Paris, IEEE Operations Center, Piscataway, NJ, USA, vol. 7, Jun. 20, 2004, pp. 3812-1816, XP010712393.

* cited by examiner

METHOD OF MEASURING INTEGRITY OF WIRELESS SIGNALLING SYSTEMS

The present invention relates generally to a method of measuring integrity and robustness of wireless signalling systems and more specifically to a method of measuring integrity and robustness to link failure, for use with wireless signalling systems.

Wireless signalling systems comprise a plurality of devices arranged in a network, that are capable of exchanging information wirelessly, in order to transmit signals across the system. In the present arrangement, the term link is used to describe communication between the network devices and accordingly, the term link failure is used to describe a failure in said communication between network devices.

By devices it is meant any device capable of transmitting and/or receiving electronic signals.

The signal strength of each link can be monitored to assess the integrity of the links in the wireless system, however this information only provides a snapshot of information and further, does not provide an indication of alternative communication routes that could be utilised in the event of a link failure. By identifying the number of alternative and unique communication routes that are available within a system, the integrity and robustness to link failure of a wireless signalling system can be determined.

Accordingly, it is an object of the present invention to provide an improved method of measuring the integrity and robustness to link failure of a wireless signalling system by determining the number of unique routes between an initiating device and a target device.

By initiating device it is meant any device capable of transmitting a communication that is capable of being received by a device comprising the wireless signalling system.

It is a further object of the present invention to provide an improved method of measuring integrity and robustness to link failure of a wireless signalling system that is operable with a battery operated wireless signalling system.

Thus and in accordance with the present invention there is provided a method of measuring system integrity and robustness to link failure for use with a wireless signalling system comprising calculation of the number of unique communication routes available for message transfer between an initiating device and a target device wherein unique routes are non-converging and defined by message source and signal strength data derived from a plurality of system devices.

It will be appreciated that the method of measuring system integrity and robustness to link failure as described herein determines the number of unique alternative communication routes within a wireless signalling system arrangement, which is used to provide an improved indication of system integrity and robustness to link failure when compared to signal strength alone.

The method of measuring system integrity and robustness to link failure, hereinafter referred to as the Method is preferably operable with a wireless signalling system, including but not limited to a battery operated wireless signalling system.

The Method preferably comprises a means of configuring network devices to collate information about other network devices that they are able to communicate with.

The Method preferably comprises a means of configuring network devices to analyse received messages to determine the source, routing information and signal strength of said received messages.

The Method may further be capable of configuring network devices to process information contained in received messages to identify other network devices that are in range of this device, that are capable of being messaged if necessary.

The Method may be further capable of configuring network devices to distinguish between messages that have been sent from an initiating device, from those sent from other network devices, such as for example intermediate network devices.

For the purposes of illustration of the present invention, by initiating device it is meant any device that transmits a communication, by intermediate network device it is meant any device capable of receiving a transmitted communication and subsequently passing it on to a further device and by target device it is meant any device that is intended to be the final destination of a transmitted communication. It will of course be appreciated that other descriptions may be used without departing from the scope of invention as described herein.

The Method is preferably capable of configuring network devices to identify messages that have been received directly from a source device, so that the source device identification number may be stored as a device that is within communication range of a particular device.

The Method may be further capable of identifying messages with a minimum signal strength, said minimum signal strength being above an operational threshold and storing the identification number of the network device sending out such messages, as a device that is within communication range of a particular device.

The Method is preferably capable of configuring network devices to collate information relating to other network devices that are within communication range of a particular device, and forward said collated information to a receiving device within the wireless system. Said forwarding of collated information may be referred to as a poll and most preferably, each network device may be allocated a unique poll time during which to transmit information, so as to prevent simultaneous polling of information from a plurality of network devices, which may cause a clash of messages which is likely to result in message communication failure.

The Method may be capable of configuring a target device to process data relating to available wireless links to calculate the number of unique communication routes between an initiating device and said target device.

The method may further be capable of configuring a target device to transmit data relating to available wireless links to a remote processing device, wherein said remote processing device may be capable of calculating the number of unique communication routes between an initiating device and a target device.

By unique communication routes, it is meant routes that do not converge with one another.

The number of unique communication routes is most preferably used as a measure of the wireless signalling system's integrity and robustness to link failure. For example, a low number of unique communication routes may be indicative of a potential weakness in the wireless system and thus reduced robustness to link failure, whereas a higher number of unique communication routes may be indicative of a robust wireless system that is capable of adapting well to link failure, by having a plurality of alternative communication routes that may be used to transmit information across the wireless system.

The target device and/or remote processing device may be capable of presenting data relating to the available routes in a plurality of formats, including but not limited to a graphical representation. Said graphical representation may illustrate, for example, available communication routes, signal strength of each available communication routes and/or device attributes.

The target device and/or processing device may be capable of receiving user input such as for example to manipulate the wireless system configuration in a virtual environment using the graphical interface, to enable an engineer or other user to assess the impact on the performance of the wireless system arising from relocation of wireless devices within the system, without having to physically move said devices.

The invention will now be described further by way of example only and with reference to the accompanying drawings in which.

Figure 1:
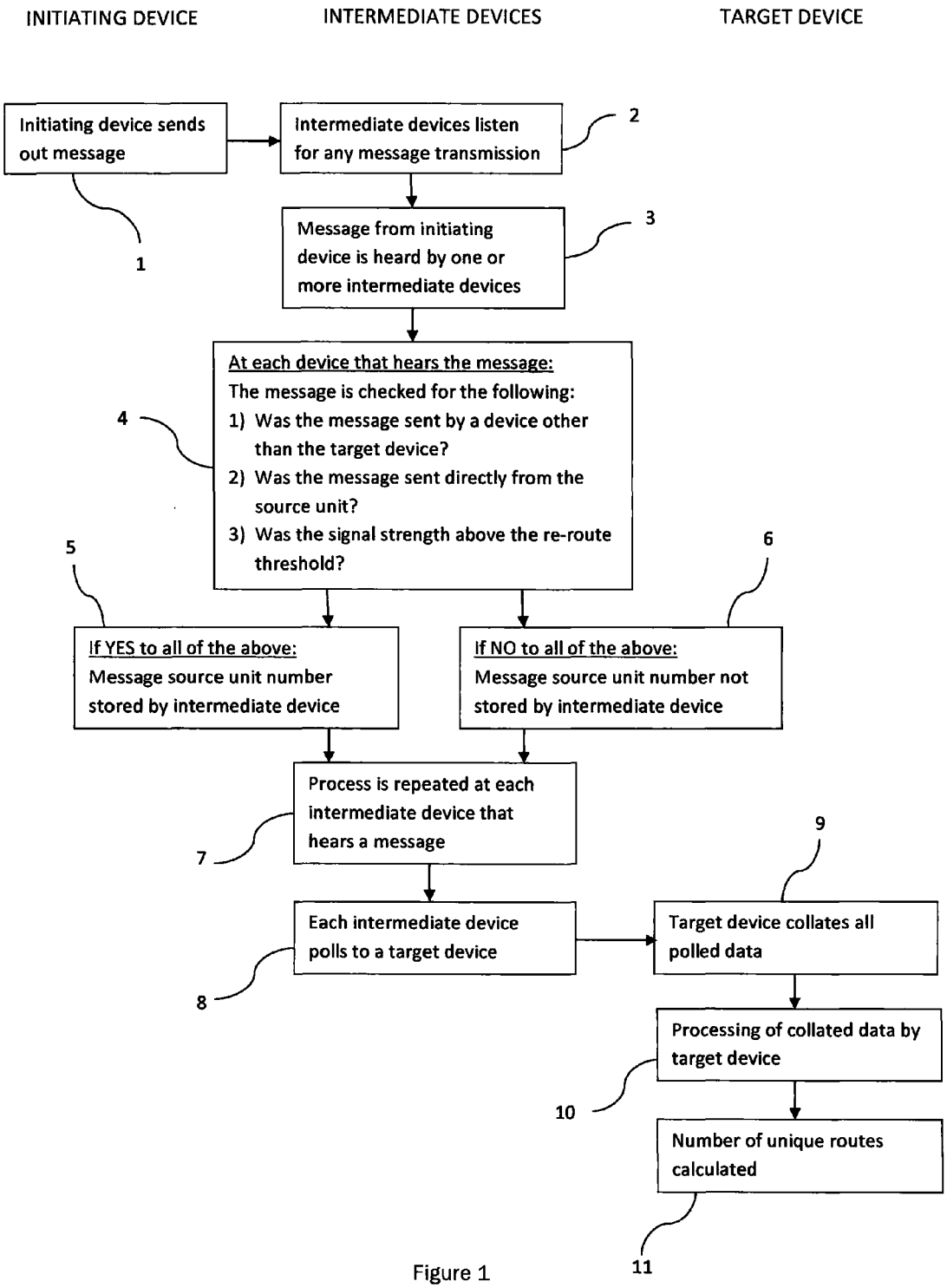
FIG. 1 shows a flow chart illustrating the steps of the Method.

Referring now to FIG. 1 there is shown a flow chart illustrating the steps that comprise the Method of measuring system integrity and robustness to link failure.

An initiating device sends out a message 1. Intermediate devices listen 2 for any messages being transmitted and devices that are within an operable range of the transmitted message are able to hear it 3.

On hearing 3 a message, irrespective of its source or destination, an intermediate device will analyse 4 the message for the following conditions; a) Was the message sent by a device other than the target device?, b) Was the message sent directly from the source unit? c) Was the signal strength above the re-route threshold?

If all above conditions are met 5, then the message source unit number is stored by the intermediate device as a unit that is within range of this range of this device. This indicates a successful communication link of sufficient strength and integrity between the initiating device and the intermediate device and further indicates that this unit can be messaged if necessary.

If all of the above conditions are not satisfied 6, then the message source unit number is not stored by the intermediate device, as the unit is not considered to be a device within range and therefore is not capable of being messaged if necessary.

Each intermediate device within the system analyses each received message and repeats 7 the above process, thus compiling a list of all other devices that are within range of each device.

Each device within the wireless signalling system then periodically polls 8 the data comprising the list of devices within range to a target device. Each device polls 8 at a specific time, determined by the identification number of the device, thus ensuring that each device within the system has its own unique poll time which prevents clashing of poll messages from multiple devices.

The target device then collates 9 this poll information from all devices within the wireless system to form a complete list of which devices can hear and communicate with which devices. The target device then uses this information to establish operational communication routes 10 within the wireless system.

From the available operational routes, any duplicate or converging routes are deducted, therefore calculating the number of unique communication routes 11. As these communication routes are based on factors including signal strength, this number of unique routes provides a measure of the integrity and robustness to link failure of the wireless signalling system.

Figure 2:
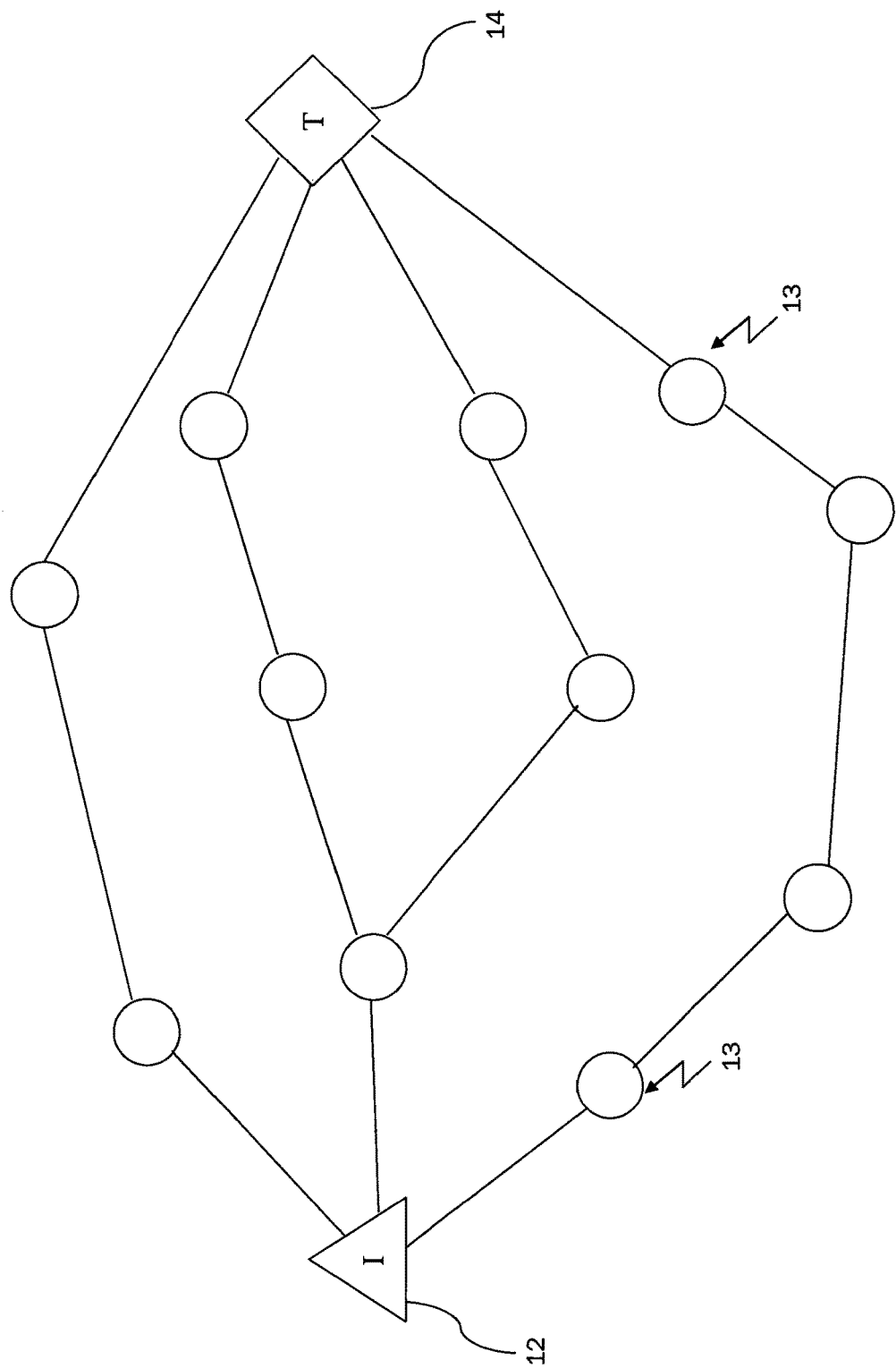
FIG. 2 illustrates a wireless signalling system comprising an initiating device for transmitting a message, a plurality of intermediate network devices for receiving and forwarding the message and a target device being the final destination of the transmitted message.

Referring now to FIG. 2 there is shown an illustration of a wireless signalling system comprising 4 unique routes from an initiating device 12 to a target device 14. In the event of a link failure that causes an existing route to become redundant, there will be 3 alternative routes comprising alternative intermediate devices 13, via which to transmit a message. In the present illustration, the measure of system integrity would be 4, as there are 4 available unique routes.

The higher the number of unique available routes, the higher the system integrity and robustness to link failure, as there will be a greater number of alternative routes for message transmission in the event of a link failure in an established route.

It is to be understood that whilst the present example describes the ability for the target device to collate and process the poll data received from each device comprising the wireless system, in this or other embodiments, a target device may transmit the collated poll data to a separate processing device. The separate processing device is then able to process the collated poll data to calculate the number of unique communication routes as described above, thus providing a measure of the system's integrity and robustness to link failure.

The target device and/or processing device is capable of illustrating the available and/or unique communication routes in graphical form. It will of course be appreciated that said communication routes may also be represented in an alternative form, including but not limited to an audio representation.

The measure of system integrity is thus calculated by the number of unique routes that a device can use to transmit a message to a target device, wherein unique means that an alternative route does not converge with an existing route.

The Method of measuring wireless system integrity and robustness to link failure as described herein is capable of application with a battery operated wireless signalling system, as individual network devices are not required to process information relating to system integrity. Individual network devices simply poll their own list of other network devices that they are capable of communicating with, and all processing of information received from the individual network devices is done at a target device and/or processing device that is typically not reliant on battery power.

It is of course to be understood that the invention is not intended to be restricted to the embodiments described above which are described by way of example only.

The invention claimed is:

1. A method of providing a measure of system integrity and robustness to link failure for use with a wireless signalling system, said wireless signaling system including a plurality of wireless devices arranged in a network, the method comprising:
   calculating a total number of unique communication routes available for message transfer between an initiating device and a target device within the wireless signaling system;

calculating the measure of system integrity based on the total number of unique communication routes available; and representing the measure of system integrity to a user;

wherein unique routes are non-converging through intermediate devices between the initiating device and target device within the wireless signaling system, are defined by message source and have a signal strength above a minimum threshold, wherein the message source identifies the initiating device or one of the intermediate devices in the wireless signaling system, and wherein the signal strength data is derived from the received signal strength between the receiving device and the message source, wherein the receiving device is one of the intermediate devices; and wherein as the total number of unique communication routes increases, the measure of system integrity and robustness to link failure increases.

2. The method according to claim 1, said method further comprising:

configuring devices in the network to collect information about other devices in the network that they are able to communicate with.

3. The method according to claim 2, said method further comprising:

configuring devices in the network to analyse received messages to determine the source, routing information and signal strength of said received messages.

4. The method according to claim 1, said method further comprising:

configuring devices in the network to distinguish between messages that have been sent from an initiating device from those sent from other devices in the network.

5. The method according to claim 1, said method further comprising:

configuring devices in the network to identify messages that have been received directly from a source device so that the source device identification number may be stored as a device that is within communication range of another respective device.

6. The method according claim 1, said method further comprising:

identifying messages with a minimum signal strength, said minimum signal strength being above an operational threshold and storing the identification number of the devices in the network sending out such messages as a device that is within communication range of another respective device.

7. The method according to claim 1, said method further comprising:

configuring devices in the network to process information contained in received messages to identify other network devices that are in range of the device to be capable of being sent a message.

8. A method according to claim 1 further comprising illustrating the available and/or unique communication routes.

9. A method according to claim 8 wherein the available and/or unique communication routes are represented in graphical and/or audio form.

10. A method of providing a measure of system integrity and robustness to link failure for use with a wireless signalling system, said wireless signaling system including a plurality of wireless devices arranged in a network having an initiating device and a target device and a plurality of intermediate devices therebetween, the method comprising:

sending a signal comprising a message from an initiating device;

listening by a plurality of intermediate devices for a message being sent, each intermediate device configured and arranged to resend the message;

wherein each intermediate device receiving a message is configured to perform the following steps:
  i) determining if the message was sent by a device other than the target device;
  ii) determining is the message sent was directly from the initiating device;
  iii) determining if signal strength of the received signal is above a re-rout threshold;
  iv) storing identification data of a sending device in the intermediate device based on the resolution of steps (i)-(iii) provided the signal strength is above the re-rout threshold;

sending all intermediate device stored identification data to the target device;

collating the identification data;

calculating the total number of unique routes based on the identification data;

calculating the measure of system integrity based on the total number of unique communication routes available, wherein as the total number of unique communication routes increase, the measure of system integrity and robustness to link failure increases; and representing the measure of system integrity to a user.

11. A method according to claim 10 further comprising illustrating the available and/or unique communication routes.

12. A method according to claim 11 wherein the available and/or unique communication routes are represented in graphical and/or audio form.

* * * * *